(12) United States Patent
Fernandez Gomez et al.

(10) Patent No.: US 10,774,813 B2
(45) Date of Patent: Sep. 15, 2020

(54) FLOATING STRUCTURE AND METHOD OF INSTALLING SAME

(71) Applicants: ESTEYCO S.A.P., Madrid (ES); SEA WIND TOWERS S.L., Madrid (ES)

(72) Inventors: Miguel Angel Fernandez Gomez, Madrid (ES); José Serna García Conde, Madrid (ES)

(73) Assignees: Esteyco S.A.P, Madrid (ES); Sea Wind Towers S.L., Madrid (ES)

( * ) Notice: Subject to any disclaimer, the term of this patent is extended or adjusted under 35 U.S.C. 154(b) by 0 days.

(21) Appl. No.: 15/362,186

(22) PCT Filed: May 27, 2015

(86) PCT No.: PCT/ES2015/070412
§ 371 (c)(1),
(2) Date: Nov. 28, 2016

(87) PCT Pub. No.: WO2015/181424
PCT Pub. Date: Mar. 12, 2015

(65) Prior Publication Data
US 2018/0148140 A1    May 31, 2018

(30) Foreign Application Priority Data

May 27, 2014    (ES) ................. P201430794

(51) Int. Cl.
*B63B 35/44*    (2006.01)
*F03D 13/25*    (2016.01)
(Continued)

(52) U.S. Cl.
CPC ............ *F03D 13/25* (2016.05); *B63B 21/502* (2013.01); *F03D 13/10* (2016.05); *F03D 13/40* (2016.05);
(Continued)

(58) Field of Classification Search
CPC ......... B63B 17/00; B63B 21/00; B63B 21/20; B63B 21/50; B63B 35/00; B63B 35/44;
(Continued)

(56) References Cited

U.S. PATENT DOCUMENTS

| | | | | |
|---|---|---|---|---|
| 1,096,192 A | * | 5/1914 | Pleva | B63B 39/06 114/121 |
| 1,299,186 A | * | 4/1919 | Imaizumi | B63B 39/06 114/122 |

(Continued)

*Primary Examiner* — Daniel V Venne
(74) *Attorney, Agent, or Firm* — Knobbe, Martens, Olson & Bear, LLP

(57) ABSTRACT

Floating construction comprising: a flotation base, comprising at least one essentially hollow body selectively fillable with ballast, where the maximum horizontal dimension of the flotation base is greater than the maximum vertical dimension of the floating base; a building supported by said flotation base preferably comprising a telescopic tower; downward impelling means; and at least three retaining cables the corresponding upper ends of which are attached to said flotation base, preferably in peripheral positions of the flotation base, and the corresponding lower ends of which are attached to said downward impelling means, such that said retaining cables are taut and apply a downward force on said flotation base that increases the stability thereof. And the installation method for this floating construction.

12 Claims, 12 Drawing Sheets

(51) Int. Cl.
  *F03D 13/10* (2016.01)
  *F03D 13/40* (2016.01)
  *B63B 21/50* (2006.01)
  *E02D 5/22* (2006.01)
  *E02B 9/08* (2006.01)

(52) U.S. Cl.
  CPC ... *B63B 2035/442* (2013.01); *B63B 2035/446* (2013.01); *E02B 9/08* (2013.01); *E02D 5/22* (2013.01); *F05B 2240/9151* (2013.01); *F05B 2240/93* (2013.01); *Y02B 10/30* (2013.01); *Y02E 10/727* (2013.01); *Y02E 10/728* (2013.01)

(58) Field of Classification Search
  CPC . B63B 38/00; B63B 2017/00; B63B 2021/00; B63B 2021/003; B63B 2021/20; B63B 2021/203; B63B 2021/206; B63B 2021/50; B63B 2021/505; B63B 2035/00; B63B 2035/009; B63B 2035/44; B63B 2035/442; B63B 2035/443; B63B 2035/446; B63B 2039/00; B63B 2207/00; B63B 2207/02; B63B 2209/20; B63B 39/00; B63B 39/02; B63B 39/03; F03D 13/25; E02D 5/22; E02B 9/08
  USPC ............. 114/258–267, 230.1, 230.2, 230.25, 114/230.26, 121, 123, 124, 125, 293, 114/65 R, 50, 51, 52
  See application file for complete search history.

(56) References Cited

U.S. PATENT DOCUMENTS

| | | | | |
|---|---|---|---|---|
| 2,561,539 A * | 7/1951 | Seward | ............... | B63B 39/062 114/122 |
| 3,029,767 A * | 4/1962 | Donnan | ............... | B63B 39/06 114/121 |
| 3,064,613 A * | 11/1962 | Hubick | ............... | B63B 39/06 114/121 |
| 3,407,766 A * | 10/1968 | Bergman | ............ | B63B 35/4413 114/126 |
| 3,589,324 A * | 6/1971 | Hoffman | ............... | B63B 39/062 114/122 |
| 3,708,991 A * | 1/1973 | Barkley | ................. | B63B 35/44 405/194 |
| 3,872,819 A * | 3/1975 | Pickens | ................. | B63H 19/02 114/293 |
| 3,986,471 A * | 10/1976 | Haselton | ............ | B63B 35/4413 114/122 |
| 4,061,102 A * | 12/1977 | Bissett | ................... | B63B 39/06 114/122 |
| 4,168,556 A * | 9/1979 | Fink | ...................... | B63B 22/021 114/264 |
| 4,435,108 A * | 3/1984 | Hampton | ................ | E21B 7/128 175/7 |
| 4,544,137 A * | 10/1985 | Johnson | .................. | B66C 13/02 212/308 |
| 4,822,311 A * | 4/1989 | Doerffer | ................ | B63B 23/28 114/349 |
| 5,005,309 A * | 4/1991 | Hall | ....................... | A01K 61/70 43/4 |
| 5,095,839 A * | 3/1992 | Peterson | ................ | B63B 39/06 114/122 |
| 5,144,904 A * | 9/1992 | Weldon | ................. | B63B 39/062 114/122 |
| 5,707,178 A * | 1/1998 | Srinivasan | ............. | B63B 9/065 405/223.1 |
| 6,022,174 A * | 2/2000 | Husvik | .................. | B63B 21/502 405/195.1 |
| 6,073,573 A * | 6/2000 | Gruber | ...................... | B63B 1/04 114/264 |
| 6,869,251 B2 * | 3/2005 | Zou | ......................... | B63B 1/048 114/256 |
| 7,520,237 B1 * | 4/2009 | Dimov Zhekov | ...... | B63B 39/10 114/264 |
| 7,934,462 B2 * | 5/2011 | Mansour | ................. | B63B 21/50 114/122 |
| 8,136,465 B2 * | 3/2012 | McCarthy | ............... | B63B 39/00 114/121 |
| 2003/0168864 A1 * | 9/2003 | Heronemus | ............ | F03D 13/25 290/55 |
| 2004/0169376 A1 * | 9/2004 | Ruer | ...................... | E02D 27/42 290/55 |
| 2008/0240864 A1 * | 10/2008 | Belinsky | ................ | E02D 27/42 405/223.1 |
| 2010/0150664 A1 * | 6/2010 | Jakubowski | .......... | B63B 21/502 405/224 |
| 2011/0140426 A1 * | 6/2011 | Garcia Lopez | ......... | F03D 13/25 290/44 |
| 2013/0233231 A1 * | 9/2013 | Dagher | .................. | B63B 21/50 114/265 |

* cited by examiner

FLOATING STRUCTURE AND METHOD OF INSTALLING SAME

CROSS REFERENCE TO RELATED APPLICATIONS

This is a U.S. national phase of International Patent Application No. PCT/ES2015/070412, filed on May 27, 2015. Priority under 35 U.S.C. § 119(a) and 35 U.S.C. § 365(b) is claimed from Spanish Patent Application No. P201430794, filed on May 27, 2014.

FIELD OF THE INVENTION

The present invention relates to a floating system intended to be installed accordingly in a location on a body of water, a lake or the like, and a method for installing the same.

The system of the present invention can be a floating substructure for a wind turbine, made in part from concrete, which in an installed condition comprises either a semi-emerged shaft and a submerged flotation base, or an emerged shaft and a semi-submerged flotation base. In this context the term "substructure" refers to the part of a wind tower intended to support thereon the generation of the wind tower, therefore including the tower itself or shaft.

For the sake of clarity in the description, the present document will refer in general to the use of a system according to the present invention in the sea, without this limiting the scope of the invention with regard to the body of water for the location in accordance with the present invention. Similarly, for the sake of clarity in the description, the present document will specifically illustrate a floating substructure system for a wind turbine, without this limiting the scope of the invention.

Although as indicated above this invention is particularly applicable for floating substructures made in part from concrete, this should not be understood as limiting the scope of the description or the claims to the application of the subject matter in this type of system, nor in substructures made in part from concrete, as the present invention is equally advantageous for use in substructures which when installed have a bottom segment made mainly from concrete up to a certain height above the water level and mainly from another material (such as steel) above said height, and is also applicable although not preferable in substructures made of a material other than concrete (such as steel) in their entire vertical dimension.

Thus, the main field of application of the present invention is the large-scale structure system industry, particularly with concrete, in combination with the industry of renewable or green power, specifically wind power.

BACKGROUND OF THE INVENTION

It is well known that wind power has gained great relevance in recent years in Spain, Europe and the rest of the world. All forecasts point to a sustained growth in wind power generation worldwide. Energy policies of the most advanced and richest countries include among their goals an increased presence of wind power.

Within this context, offshore wind farms are beginning to appear, confirming the expectation of great growth in the use of this technology in coming years. Offshore wind farms clearly entail greater costs, depending of course on the depth of the water at their location, but the wind quality is better, wind speeds are higher and turbulence is lower, resulting in more production hours which, in addition to the higher density of air at sea level generates higher income than land-based wind farms, compensating for the higher initial investment costs. In fact, it is now common, particularly in Germany, Great Britain and Scandinavian countries to promote and build offshore wind farms, with a great number of such farms being studied, in line with the expected growth of this type of wind farms, closely linked to strategic goals set by governments for reaching specific renewable energy production quotas. The trend towards using turbines with greater power and size in order to reduce the unit costs of the installed power has been constant in the development of wind turbines, particularly so for offshore wind power. Nearly all large wind turbine manufacturers are studying or in the later stages of developing high power models, with 3 or more megawatts, adapted to marine conditions, which are particularly demanding.

This power escalation and the particularly demanding marine conditions in turn imply a considerable increase in the demands on the substructure that must support the turbines, which requires developing novel concepts for said substructure with increased capacity, optimum strength and a competitive cost, particularly if the substructure will be used in locations with great depth, which may be advisable in some circumstances. Floating solutions have been proposed for these sites, all of which have been built so far have used a metal substructure.

Among the main drawbacks and limitations of known floating solutions are the following:
- The installation of substructures implies high costs related to the scarce and costly marine transportation, handling and lifting of the foundation, shaft and turbine elements.
- Steel has a limited duration in the marine medium due to the aggressive conditions of humidity and salinity, particularly in tidal movement areas. Consequently, maintenance requirements are high and costly. Together with the high sensitivity of metal structures to fatigue loads, this means that the useful lifetime of the metal components of the substructure is limited.
- Steel substructures are highly sensitive to collisions from ships, icebergs and drifting objects in general.
- There are uncertainties resulting from the variability in the cost of steel, considerably greater than that for concrete.
- Certain existing solutions present a limited stiffness for the substructure shaft, which limits the capacity for greater heights of the substructure and size of the turbines, particularly with foundation solutions with a limited stiffness, with is the most common situation in off-shore installations.
- Great dependency on specific marine lifting and transportation, which are in limited supply.

With regard to the manufacturing material, structural concrete turns out to be an optimum material for systems on water, particularly marine offshore systems. In fact, although the use of metal structures is predominant in mobile floating elements, as an extension of naval practice and always linked to continuous maintenance, concrete is instead an advantageous alternative and is therefore more common in all types of fixed maritime systems (ports, docks, breakwaters, platforms, lighthouses, etc.). This is mainly due to the durability, robustness and structural strength, reduced sensitivity to marine corrosion and practically maintenance-free service of structural concrete. With a proper design, fatigue sensitivity is also very low. Its useful lifetime generally exceeds 50 years.

Moreover, concrete is advantageous due to its tolerance in case of impact or collisions, and can be designed for example to withstand forces generated by drifting ice or the impact from small ships, as well as due to the simplicity and economy of any necessary repairs.

Structural concrete is also a universal system material, and the raw material and system materials are accessible worldwide and have moderate costs.

For this reason, concrete is increasingly used to build offshore substructures, although until now it has been generally used for substructures with foundations on the seabed, and therefore for small depths or complex structures.

SUMMARY OF THE INVENTION

One object of the present invention relates to a floating system comprising:
- a flotation base including at least one body comprising at least a cavity fillable with ballast, where the maximum horizontal dimension of the flotation base is greater than the maximum vertical dimension of the flotation base,
- a building supported by said flotation base,
- downward force means, and
- at least three retaining cables, the corresponding upper ends thereof being attached to said flotation base, preferably at peripheral positions of the flotation base, and the corresponding lower ends thereof being attached to said downward force means, such that said retaining cables are taut and exert on said flotation base a downward force that increases the stability of the floating system.

Said floating system can comprise in the installed conditions either a semi-emerged type building and a submerged type flotation base, or an emerged type building and a semi-submerged flotation base. In this regard, in the specific case that the floating system is used to support a wind turbine, in the present invention it is considered that the part of the wind tower at a lower height than the maximum height of any component of the flotation base forms part of said flotation base.

Said floating system can be a floating substructure for a wind turbine, specifically a floating substructure substantially made from concrete, and said building can comprise a shaft or tower with at least two segments, including a base segment and a head segment, supporting the wind turbine. Said shaft can preferably be telescopic.

Said shaft is formed from at least two tubular segments placed on each other coaxially, possibly with partial axial overlap, until reaching the planned height, of which at least one can be tapered in an upward direction in the installed condition of the substructure. Between two successive segments there is therefore a corresponding horizontal union. Among the shaft segments, the shaft segment intended to be placed directly on said flotation base in the installed condition of the substructure is hereinafter referred to as the "base segment" and any segment other than the base segment is hereinafter referred to as a "superposition segment". The superposition segment intended to be placed at the top of the shaft in the installed condition of the substructure is hereinafter referred to as the "head segment".

Each one of these segments can be a single piece (hereinafter referred to as an "integral segment"). Alternatively, at least one of said segments can be formed by at least two arched segments, joined to complete the circumference of the corresponding segment. Between two successive arched segments there is therefore a corresponding vertical union.

In addition, the base segment of a substructure shaft and the flotation base of said substructure can be joined continuously or be made from a single piece, without departing from the scope of the invention.

Said floating system can therefore be a floating substructure for a wind turbine, particularly a floating substructure mainly made from concrete, comprising in its installed condition either a semi-emerged shaft and a submerged flotation base, or an emerged shaft and a semi-submerged flotation base, where said floating substructure for a wind turbine comprises:
- a flotation base including at least one body comprising at least a cavity fillable with ballast, where the maximum horizontal dimension of the flotation base is greater than the maximum vertical dimension of the flotation base,
- a shaft, preferably telescopic, supported by said flotation base and comprising at least two segments, a base segment and a head segment,
- downward force means, and
- at least three retaining cables, the corresponding upper ends thereof being attached to said flotation base, preferably at peripheral positions of the flotation base, and the corresponding lower ends thereof being attached to said downward force means, such that said retaining cables are taut and exert on said flotation base a downward force that increases the stability thereof.

The floating system in accordance with the present invention can also comprise a stay the upper end of which is joined to the building, preferably a shaft, and the lower end of which is joined to the flotation base. At least one of said stays is inclined such that the lower end of the stay is farther from the central vertical axis of the building than the upper end of the stay. At least one of said stays can be formed by the extension of a corresponding retaining cable, in which case the flotation base comprises a deflection element that allows creating an elbow in the alignment of the retaining cable and the upper end of the retaining cable is finally joined to the building.

The flotation base can be a structure that comprises a single body comprising at least a cavity, sealed, in the form of a box, that is preferably made from concrete, or can be a structure comprising at least two bodies comprising at least a cavity, sealed in the form of a box, of which at least one is preferably made from concrete, said bodies joined to each other directly or through a structure such as a lattice or bar structure. Each of said bodies can have one or several inner compartments, sealed or in communication with each other.

A floating system in accordance with the present invention can be transported over water by towing or self-propulsion to the final location. For this purpose, the flotation base and at least part of the building can form a transportation unit that is floating and free standing. In the case of a floating system that is a floating substructure for a wind turbine comprising a telescopic shaft according to the present invention, the flotation base, the telescopic shaft in its retracted condition (that is, with the base segment integrally joined to the flotation base and the superposition segments housed inside each other and inside the base segment), and at least part of the wind turbine joined to the head segment of said telescopic segment, can form a transportation unit that is floating and free standing. The telescopic shaft in its retracted condition allows lowering the centre of gravity of the transportation unit and thereby improving its stability.

Preferably, during transportation the flotation base remains semi-submerged and the building, including the telescopic shaft in its retracted position, remains completely emerged. However, in the installed condition of the substructure, the flotation base is preferably completely submerged and the building is partially submerged.

In the installed condition of the system, the central vertical axis of the building coincides with the central vertical axis of the flotation base.

The aforementioned downward force means can exert a downward force or act as ballast on said flotation base. Said downward force means can comprise at least one container suspended from the retaining cables and completely submerged, located below the flotation base and above the seabed. In this case, at least part of said retaining cables are not vertical but instead are inclined with respect to the vertical line, the upper end thereof being farther from the central axis of the flotation base than the bottom end. Preferably, the container is essentially located on the central vertical axis of the flotation base. Preferably, the container comprises a concrete box, body comprising at least a cavity, the interior of which in the installed condition is completely or partially filled with ballast material, which can be a liquid or solid material. The volume of said ballast material in said container can be increased or reduced by adding or removing ballast material, which allows regulating the submerged weight of said suspended mass and in this way regulating the depth or level at which the floating system is placed, to adapt this particularly in view of the wind or wave conditions.

Said concrete box can be floating and free standing in a partially ballasted or unballasted condition, such that it can be towed to the location and ballasted on site to submerge it until reaching the final position with respect to the flotation base.

Preferably, the weight or ballast of said suspended container is enough for the centre of gravity of the whole of the floating system to descend to a level lower than the centre of buoyancy of said floating system, thereby improving its stability.

The system in accordance with the present invention can also comprise means for maintaining the position that join the floating system to the seabed, thereby preventing the system from drifting, particularly when the downward force means do not include attachment to the seabed. Said means for maintaining the position can comprise at least one mooring attached on one end to the seabed and on the other end to any element of the floating system, such as to any of the elements comprised in the flotation base, a suspended container or even to the building. The attachment of said mooring to the seabed can be performed by various systems known in the art, such as anchors, single point mooring, driven or suction piles, or simply by gravity, such that the mooring is attached to a container that allows attachment to the seabed.

At least one of said containers, whether a container attached to the seabed or a suspended container, can abut against the flotation base. Thus at least one of said abutting containers can form part of the transportation unit and be transported together with the flotation base and the building, and subsequently released or separated from the flotation base until reaching its position in the installed condition of the system.

The floating system according to the present invention can comprise collection of the retaining cables to transport them wound or in reels, forming part of the transportation unit and/or part of at least one container. Said elements allow efficient transportation of the retaining cables, such that during the installation of said cable it can be wound or unwound gradually, improving the efficiency and simplicity of the installation process, especially when the downward force means comprise containers which are ballasted for gradual descent until reaching the installed condition of the floating system.

In addition, the flotation base of a floating system according to the present invention can comprise at least one extensor arm that extends laterally outward from the perimeter of the body or group of bodies of the flotation base. In this case, at least one of the retaining cables can be attached at its upper end to a corresponding extensor arm, preferably to the free end of a corresponding extensor arm. In this case, at least one of the stays can be attached at its lower end to a corresponding extensor arm. Also in this case, at least one of said stays can be formed by the extension of a corresponding retaining cable, in which case the extensor arm comprises, preferably at its free end, a deflection element that allows creating an elbow in the alignment of the retaining cable and the upper end of the retaining cable is finally joined to the building. Also in this case the means for maintaining the position can be attached on one end to the seabed, and on the other end to at least one of said extensor arms.

The floating system according to the present invention can include under the flotation base at least one chamber with pressurised gas (for example, pressurised air) that increases the volume of water displaced by the flotation base and therefore increases the upward buoyancy force exerted on it. The enclosure containing said pressurised gas chamber is open on the bottom such that it is connected to the body of water of the site. In addition, the volume and/or pressure of the air contained in said pressurised gas chamber can be adjusted by increasing or decreasing the amount of air in the chamber, allowing to regulate the upward buoyancy force on the flotation base and in this way regulate the depth or level at which the floating system is placed, to adapt this particularly in view of the wind or wave conditions. It is also possible to adjust the depth of the floating system by changing the amount of ballast in the flotation base and/or in the container connected 18 to the at least one chamber with pressurized gas under the flotation base to adjust the weight of the container by increasing or decreasing the amount of ballast material in it.

Moreover, in this case the floating system in accordance with the present invention can harness energy from waves, by including at least one Wells type turbine on an air passage through the bottom side of the flotation base, communicating the sealed internal enclosure of the flotation base and/or the building with said pressurised gas chamber. Furthermore, the floating system in accordance with the present invention can comprise a system for regulating the size of at least one pressurised gas chamber by adjusting the volume and/or pressure of the air contained therein, which allows adjusting the resonant frequency in said pressurised gas chamber to the predominant period ranges in the incident waves, thereby increasing the oscillations of the water level in said pressurised gas chambers caused by the waves and the energy harnessing thereof.

Said Wells type turbines allow harnessing the energy from waves by the method known as oscillating water column; the waves produce rises and falls in the water sheet inside the enclosure containing the pressurised gas chamber, thereby propelling air through the passage between the gas chamber under the flotation base and the inside of the base of the flotation chamber or the shaft. The Wells type turbine can generate energy using the air flow through said passage in either direction.

Although the Wells turbine is the preferred type, other types of turbines known in the art can be used to harness the energy from a moving fluid without thereby departing from the scope of the invention.

Another object of the present invention relates to a method for installing a floating system as described above.

The installation method according to the present invention comprises the following steps, in any order:

A) manufacturing the flotation base on-shore or in-shore,
B) dry manufacturing of the building,
C) forming a transport unit on-shore or in-shore,
D) transporting the transport unit in a floating manner, preferably using tug boats, to the site,
E) attaching one end of the retaining cables to the flotation base and attaching the other end of the retaining cables to the downward force means,
F) attaching the means for maintaining the position to the system.

If the floating system is a floating substructure for a wind turbine comprising a telescopic tower, the installation method according to the present invention comprises the following steps in any order:

A) manufacturing the flotation base on-shore or in-shore,
B) dry manufacturing the telescopic shaft, including at least one base segment and one head segment,
C) forming a transport unit on-shore or in-shore according to the following sub-steps:
C1) attaching the telescopic shaft in retracted condition to the flotation base,
C2) attaching at least part of the wind turbine to the head segment,
C3) attaching the extensor arms to the flotation base,
C4) attaching the stays to the flotation base,
C5) attaching the at least one Wells type turbine to the flotation base,
D) transporting the transport unit in a floating manner, either by using tug boats or by self-propulsion, to the site,
E) attaching one end of the retaining cables to the flotation base and attaching the other end of the retaining cables to the downward force means,
F) attaching to the substructure the means for maintaining the position,
G) extending the telescopic shaft.

The wind turbine (step C2) is preferably attached before step D) floating transport and before step G) extension of the telescopic shaft, but they may be attached at a different time without departing from the scope of the present invention.

The installation method according to the present invention also comprises before step D) the following step:

H) placing the flotation base on the body of water at the site.

The installation method according to the present invention can also comprise after step D) the following step:

I) ballasting the flotation base to submerge it to the desired depth for the installed condition, The installation method according to the present invention can also comprise before step E) the following steps:

K1) manufacturing on-shore or in-shore at least one concrete box with the downward force means and placing it in the body of water of the site,
K2) transporting said concrete box in a floating manner, using tug boats, to the site,
K3) ballasting said concrete box such that its total weight increases and it is submerged to its operational depth.

and then the installation method according to the present invention can also comprise, in section E): adjusting the distance between the floating base and the downward force means.

In at least one of said steps of the installation method according to the present invention, one or more tug boats can be used to control the surface position of the floating substructure.

Optionally, step G) of the installation method according to the present invention is divided into two or more steps, which are inserted between or performed simultaneously to the other steps of the method. It can include for example one or more steps after step D) and before step I) and one or more steps after step I).

Similarly, step D) of the installation method according to the present invention is preferably divided into two or more steps, including:

a transportation stage without downward force means, previous to step E), to a working area different from the site, and
a transportation stage with downward force means, after step E), from said working area to the site.

As indicated, the order of the steps can be any order without departing from the scope of the invention. For example, step D) can also be performed after step E), in order to establish all the connections of the retaining cable in port or in-shore conditions.

Finally, if step C2) includes installation on the head segment of only one part of the wind turbine, the method also comprises after step D) the following step:

N) assembling on the head segment all the wind turbines.

It must be noted that, by using a special type of substructure designed to provide solutions for a supporting substructure for large capacity turbines, the present invention allows providing a repowerable substructure. That is, a substructure originally designed with an increased capacity and adaptability to allow repowering (subsequent replacement of the original turbine by a new turbine with greater power, efficiency and profitability) using the same substructure.

It must also be noted that the installation method according to the present invention as described above is reversible. That is, the steps performed can be executed in the opposite order to dismantle the system, in order to remove it completely or to perform work of any type on the structure in port and reinstall it. In addition, when the floating system is a floating substructure for a wind turbine, the telescopic shaft can be configured to return to the retracted condition at any time of the useful lifetime of the substructure, such as for maintenance actions or for repowering.

The present invention therefore provides a floating system and a method for installing the same, particularly applicable to systems made in part from concrete that require expensive equipment to be able to transport them.

The flotation base according to the present invention can be considered to be analogous to the foundation block of a gravity foundation solution resting on the seabed. However, it is possible to make the flotation base of the present invention with a less complex design if it is not ballasted, as this allows preventing valve mountings for such purpose. Even if it is ballasted, the external and internal pressure differences on the walls of the flotation base are less than those withstood in case of ballasting to the seabed. In addition, the flotation base of the present invention requires a less bulky structure since the efficacy of the gravity foundations with respect to stabilization are closely linked to their weight, which is normally solved by using large volumes heavily ballasted that must be able to withstand the transmission of high forces to the seabed. These features can allow keeping costs relatively low.

In short, the present invention provides a floating system and a method for installing the same in offshore waters, are relatively simple, efficient, safe and economical, both for installation and maintenance, and/or, in the case of floating substructures for wind turbines, repowering.

BRIEF DESCRIPTION OF THE DRAWINGS

These and other features and advantages of the present invention will become apparent in view of the following non-limiting description of an embodiment of the invention, made with reference to the accompanying drawings, where.

DETAILED DESCRIPTION OF AT LEAST ONE EMBODIMENT OF THE INVENTION

Figure 1:
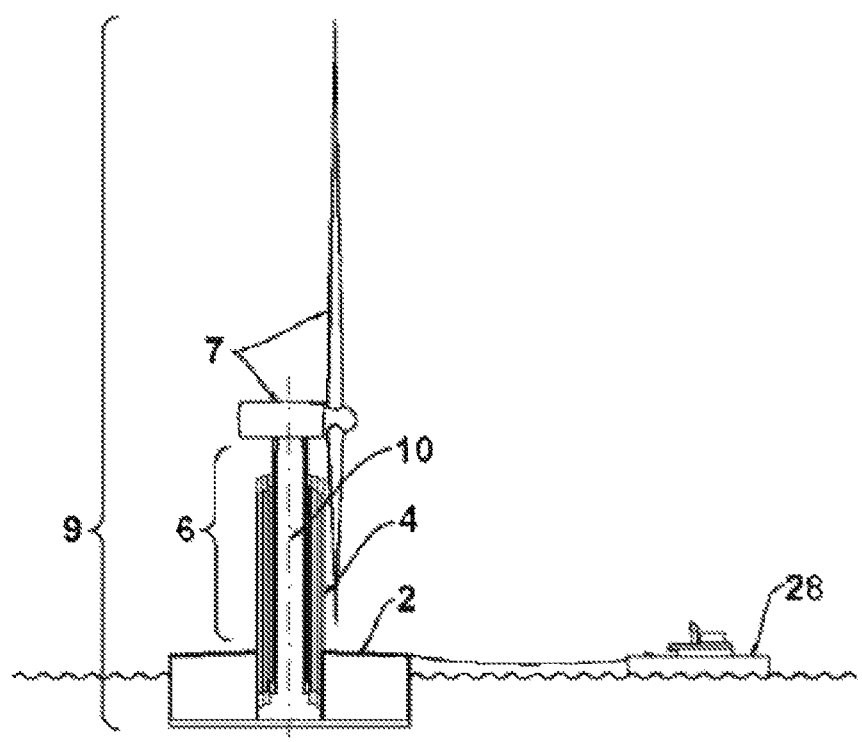
FIG. 1 shows a schematic plan view with a partial cross-section of a transportation unit with a shaft in the retracted condition, with a wind turbine.
Figure 6:
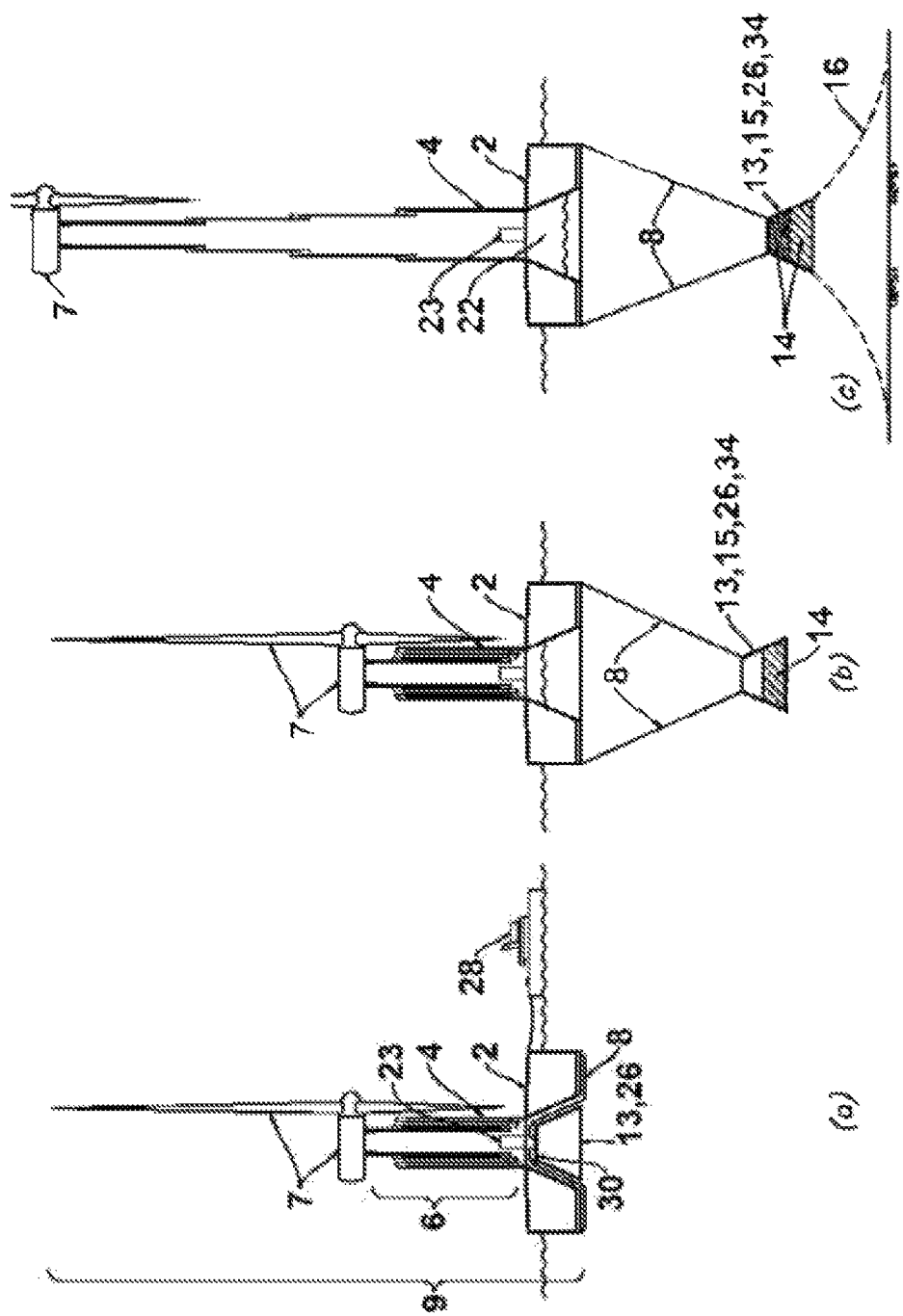
FIG. 6 shows three schematic plan views with a partial cross-section of the corresponding stages in the installation method for a floating substructure with a single suspended massive body and means for maintaining the position, with a wind turbine.
Figure 7:
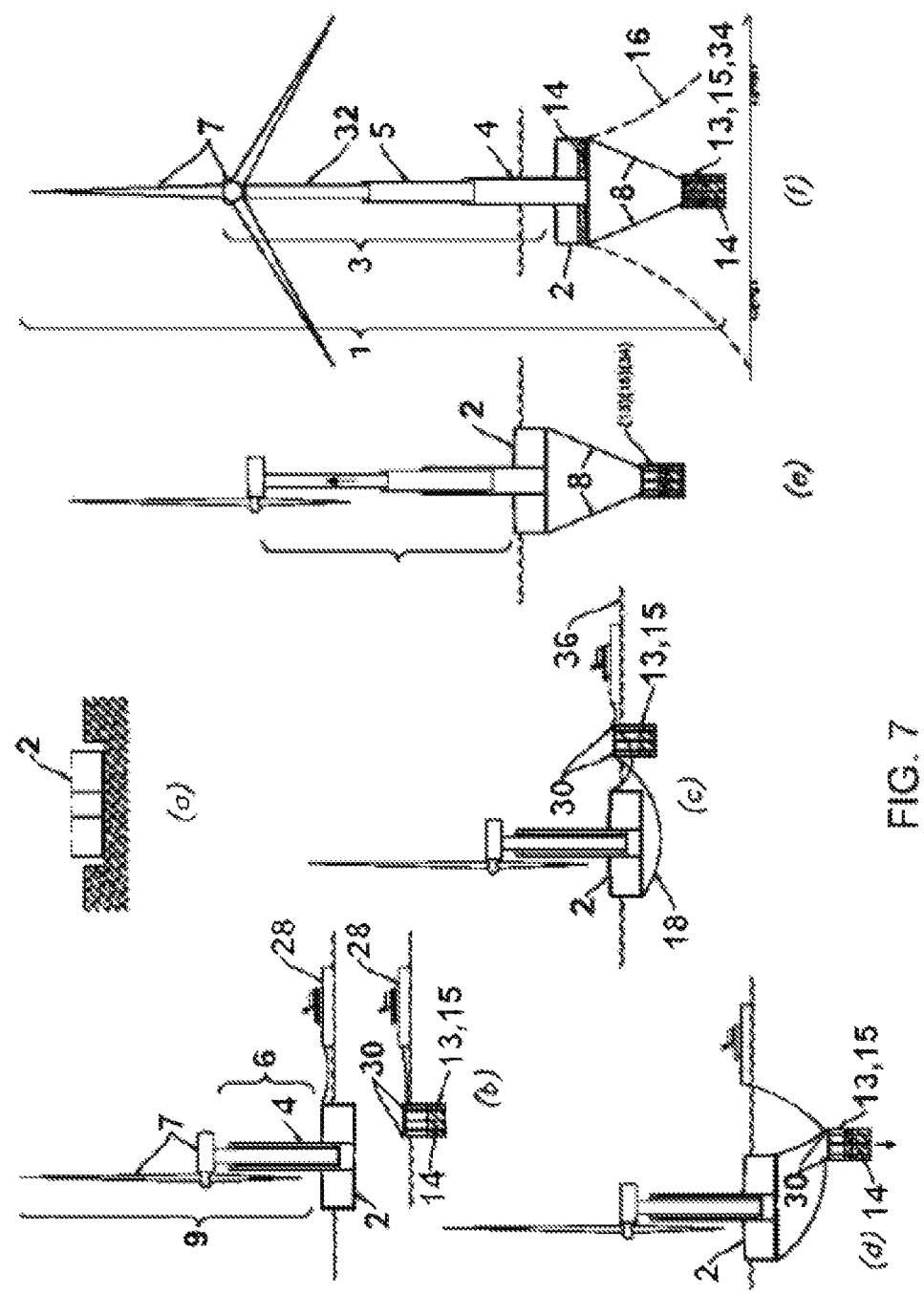
FIG. 7 shows six schematic plan views with a partial cross-section of the corresponding stages in the installation method for a floating substructure with a single suspended massive body, with a wind turbine.
Figure 8:
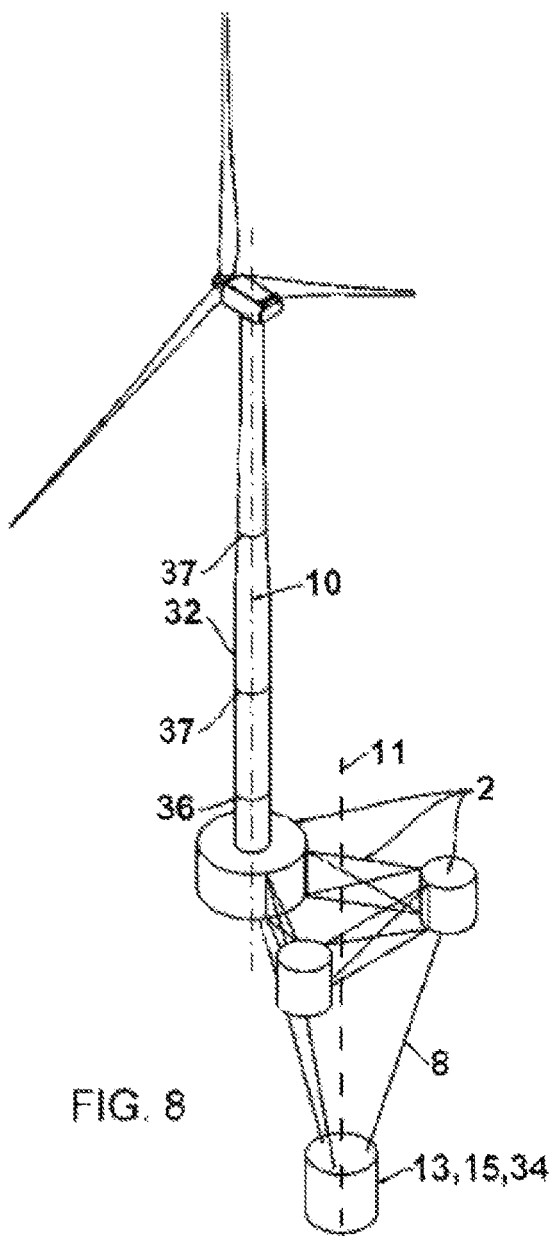
FIG. 8 shows a schematic perspective view of a floating substructure with a single suspended massive body and a flotation base with several bodies, with a non-telescopic shaft and a wind turbine.
Figure 11:
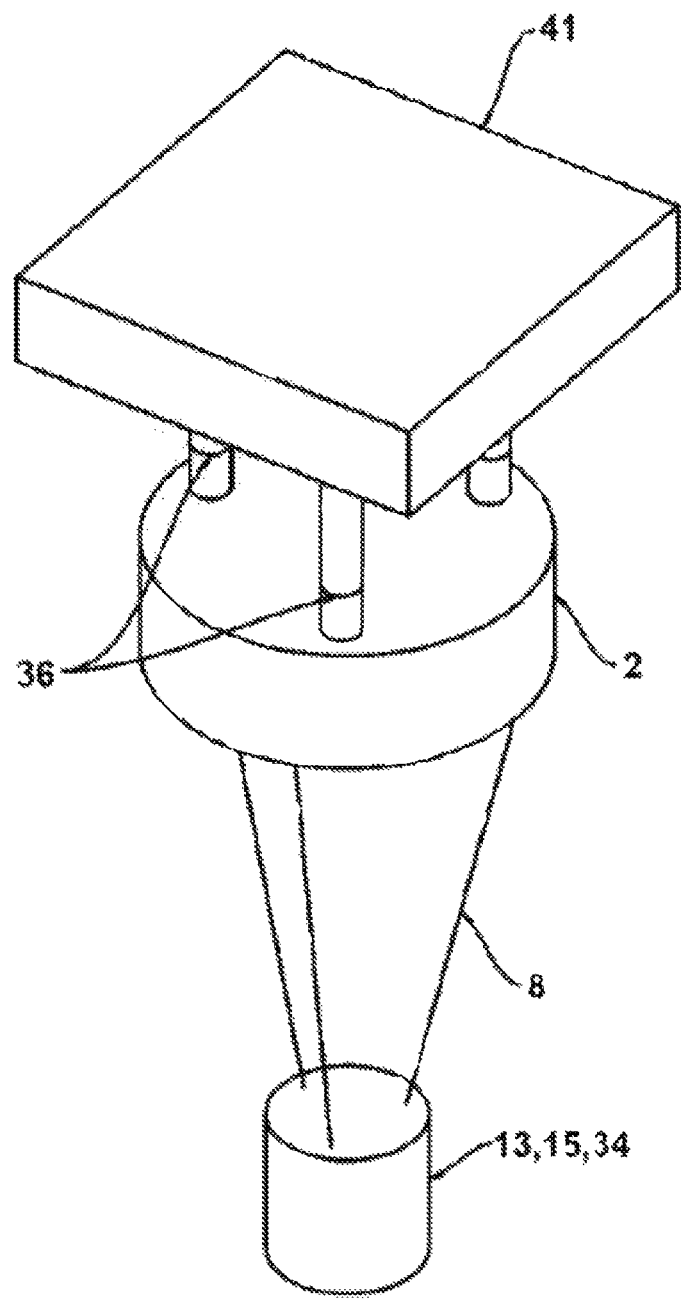
FIG. 11 shows a schematic perspective view of a floating system with a single suspended massive body and a flotation base with a single body that supports three shafts, and on these a rectangular hexahedral platform.

With reference to the accompanying figures, all of which show a floating system which, in installed condition, according to the present invention, comprises: a floating base 2, which includes at least one body comprising at least a cavity 25, the maximum horizontal dimension MHD of which is greater than its maximum vertical dimension MVD; a building supported by said flotation base 2; downward force means 13, 15, 34; and at least three retaining cables 8 the corresponding upper ends of which are joined to said flotation base 2 and the corresponding lower ends of which are joined to said downward force means. In addition, in all figures except 8 and 11 the building that forms part of the floating system comprises a telescopic shaft 3 where the wind turbine 7 shown is an accessory that is optional and/or interchangeable with other accessories, depending on the use of the floating system, illustrated only by way of example to describe the embodiments of the invention. In FIG. 8 the shaft is not telescopic. In FIG. 11 the building that forms part of the floating system comprises three shafts 36 supported directly by the flotation base 2 and an electrical substation 41 supported by said shafts and represented schematically by a rectangular hexahedral platform. Said shafts can have one or several segments. The shafts 36 shown are not telescopic but telescopic shafts can also be used in order to temporarily lower the centre of gravity of the assembly. In any case, the flotation base 2 is large enough to ensure stable flotation of the assembly comprising the flotation base 2 itself and the corresponding building. In the case of FIGS. 1, 6 and 7, the flotation base 2 has dimensions allowing to ensure the stable flotation of the assembly comprising the flotation base 2 itself, the telescopic shaft 3 in retracted condition and at least part of the wind turbine 7 placed on the head of said shaft.

However, FIG. 1 shows a floating substructure in which said downward force means and said retaining cables 8 have not been attached to form the complete floating substructure 1 according to the invention, since it shows stages of the installation method for the floating substructure 1 previous to the installed condition.

Specifically, FIG. 1 shows a transport unit 9 in a transportation stage of an embodiment of the installation method according to the present invention, where a floating and free-standing transport unit 9, formed by a floating base 2, a telescopic shaft 3 in folded condition supported by said flotation base 2, and a wind turbine 7 joined to the head segment 32 of said telescopic shaft 3 is towed by a tug boat 28. In the transportation stage shown in FIG. 1, the downward force means and the retaining cables 8 are transported separately from said transport unit 9 and attached subsequently to the transport unit 9.

Reference will now be made to FIGS. 2 to 5, each one of which shows a different embodiment of a floating substructure 1 according to the invention.

Figure 2:
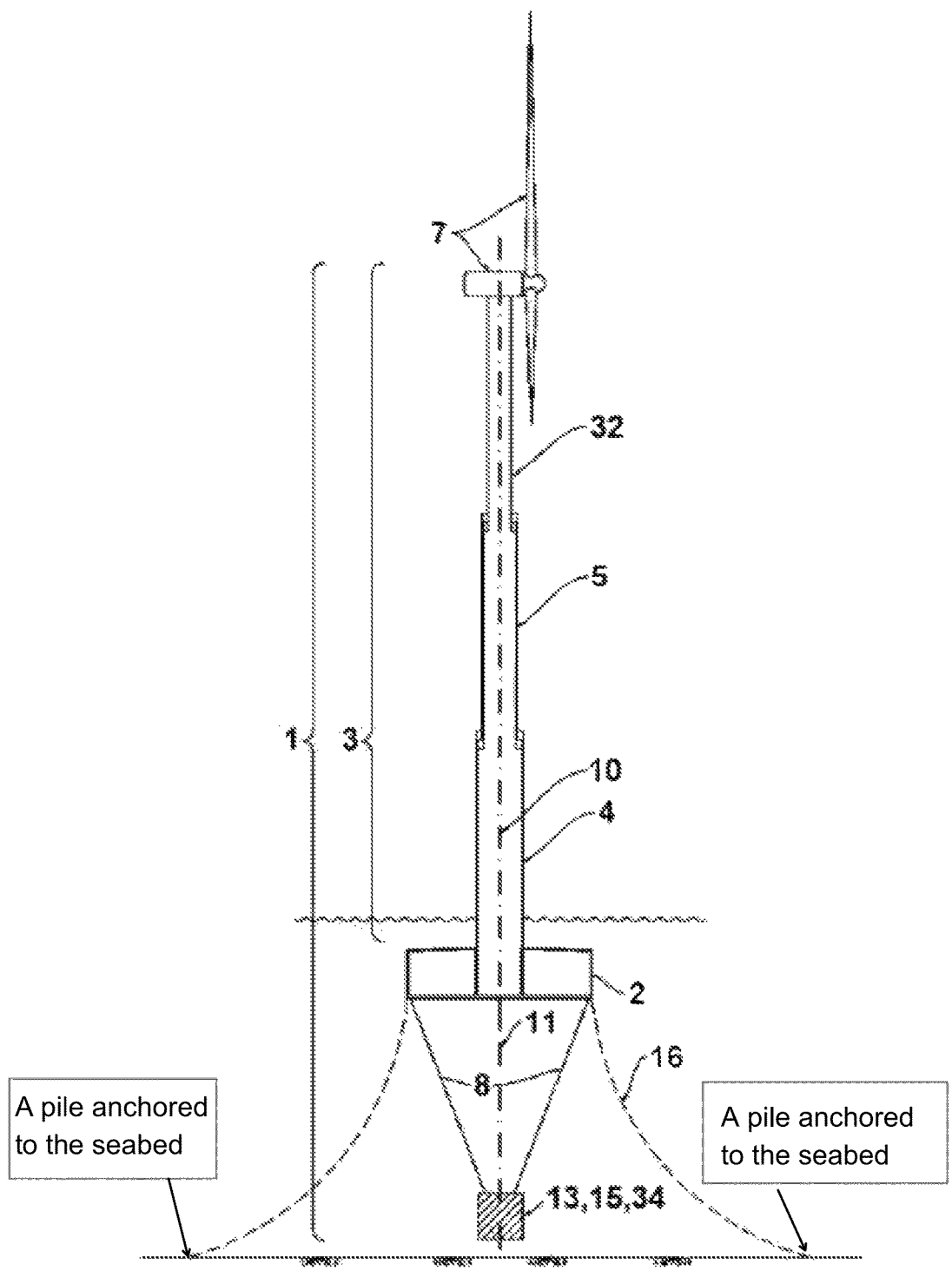
FIG. 2 shows a schematic plan view with a partial cross-section of a floating substructure with a single suspended massive body and chains as means for maintaining its position, with a wind turbine.

FIG. 2 shows a wind turbine 7 supported by an extended telescopic shaft 3 formed by three tubular segments, that is, a base segment 4 and two superposition segments 5, 32. In this case the two lower segments are made from concrete while the head segment 32 is made from metal. In turn, the telescopic shaft 3 rests by its base segment 4 on a flotation base 2. In this embodiment the shaft is semi-emerged and the flotation base 2 is submerged, together forming part of a floating substructure 1 for a wind turbine. From the peripheral area of said flotation base 2 emerge three retaining cables 8 (of which only two are visible due to the view shown). These retaining cables 8 are joined on the end opposite the end attached to the flotation base 2, to a container in the form of a hollow box 13 made from concrete. The interior of the common box 13 is completely filled with ballast material 14, such that the flotation base 2 is at its operational depth. Said cables are deployed at an angle to the vertical, such that the upper end of each cable is farther from the central vertical axis 10 of the shaft than the lower end of the same cable. In this embodiment, the flotation base 2 has different compartments that can be ballasted differentially, allowing to generate a non-uniform distribution of the ballast that counteracts, at least partially, external actions such as waves, sea currents, etc. Specifically, a differential ballasting of various compartments counteracting the inclination caused by the average wind force may be of interest. The ballast material 14 can be a liquid material, a solid material or a mixture of both.

In this embodiment, the floating substructure 1 further comprises means 16 for maintaining the position by which the floating substructure 1 is attached to the seabed. Said means 16 for maintaining the position comprise three moorings, each of which starts at the peripheral area of said flotation base 2 and hangs down away from the flotation base 2 until reaching and resting on the seabed. In this embodiment, each of these moorings is formed by a chain, and said assembly of chains, or moorings, prevents or at least limits the lateral movement of the floating substructure 1. Alternatively, said moorings can consist of metal or fibre cables, or other types known in the art, without departing from the scope of the invention. The weight of the container maintains the retaining cables taut, which together with the substantially triangular arrangement allows the container to move substantially together with the floating base, thereby improving the stabilization effect.

In this embodiment the retaining cables are designed such that their axis passes approximately through the centre of gravity of the container, which improves the behaviour of the assembly as the centre of forces is located near the alignment of said cables. In addition, in this embodiment the retaining cables adopt a sufficient inclination greater than 1 degree, such that the limited inclinations that the floating system will experience during its operation will not manage to make a retaining cable vertical, which is suitable for preventing slacking phenomena, in which the retaining cables lose tension.

Figure 3:
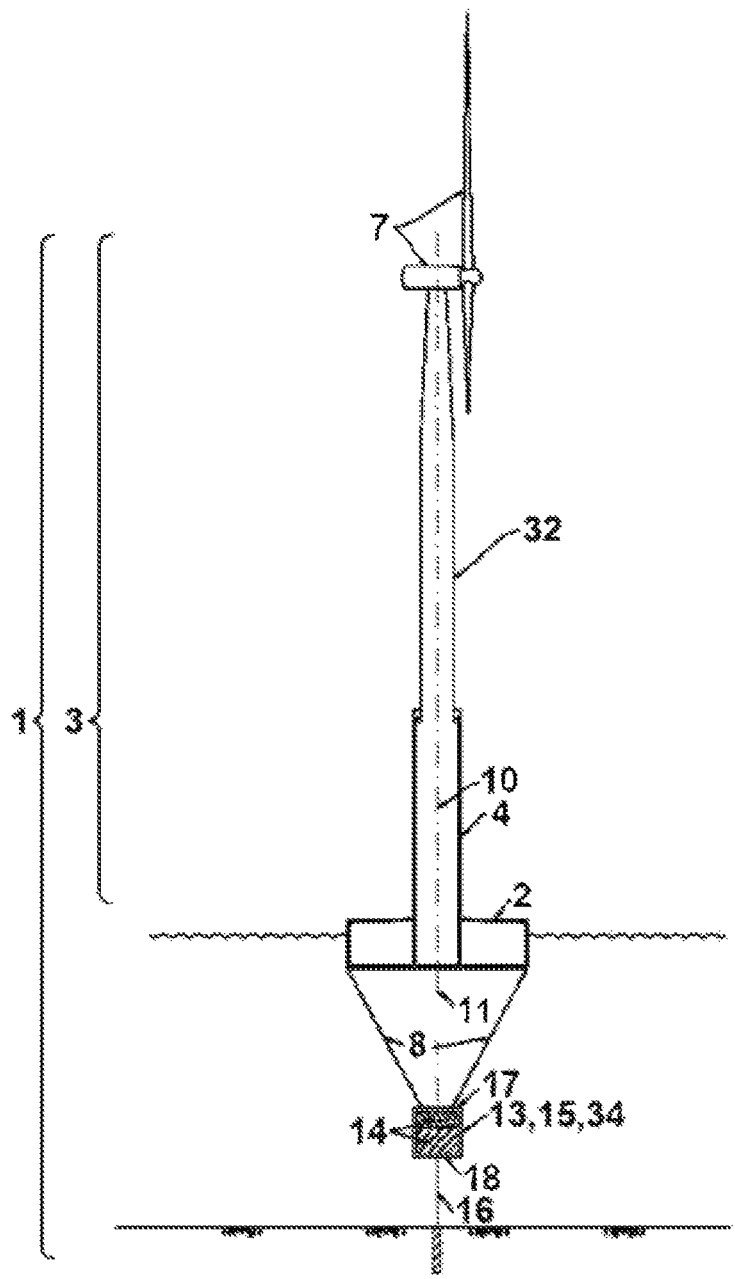
FIG. 3 shows a schematic plan view with a partial cross-section of a floating substructure with a single suspended massive body and a cable-pile assembly as means for maintaining the position, with a wind turbine.

FIG. 3 represents a wind turbine 7 supported on an extended telescopic shaft 3 formed by two tubular segments, a base segment 4 in this case made from concrete and a head segment 32, in this case metallic. In turn, the telescopic shaft 3 rests by its base segment 4 on a flotation base 2. In this embodiment the shaft is emerged and the flotation base 2 is semi-submerged, together forming part of a floating substructure 1 for a wind turbine. From the peripheral area of said flotation base 2 emerge three retaining cables 8 (of which only two are visible due to the view shown). These retaining cables 8 are joined on the end opposite the end attached to the flotation base 2, to a container in the form of a hollow box 13 made from concrete. The interior of the common box 13 is completely filled with a specific mix of ballast materials that include liquid and solid materials, such that the flotation base 2 is at its operational depth. The hollow box 13 is connected 18 (the cable is not shown due to the view shown) to the flotation base and the weight of the container can be adjusted by increasing or decreasing the amount of ballast material in it. The retaining cables are deployed at an angle to the vertical, such that the upper end of each cable is farther from the central vertical axis 10 of the shaft than the lower end of the same cable. In this embodiment, the flotation base 2 is not ballasted.

In this embodiment, the floating substructure 1 further comprises means 16 for maintaining the position by which the floating substructure 1 is attached to the seabed. Said means 16 for maintaining the lateral position comprise a pile anchored to the seabed and a single mooring attached on one end to the common box 13 and on the other end to said pile. As indicated above, the interior of the common box 13 is completely filled with a specific mixture of ballast materials, such that the flotation base 2 is placed at its operational depth, such that the means 16 for maintaining the position are not intended or designed to provide a downward force means in order to determine the depth of the floating substructure 1; instead, they only withstand the tensions caused by forces exerted on the floating substructure 1 by external actors, such as waves, sea currents, etc. In any case, the means for maintaining the position can exert certain downward forces that contribute to stability, together with that exerted by the downward force means, without departing from the scope of the present invention.

Figure 4:
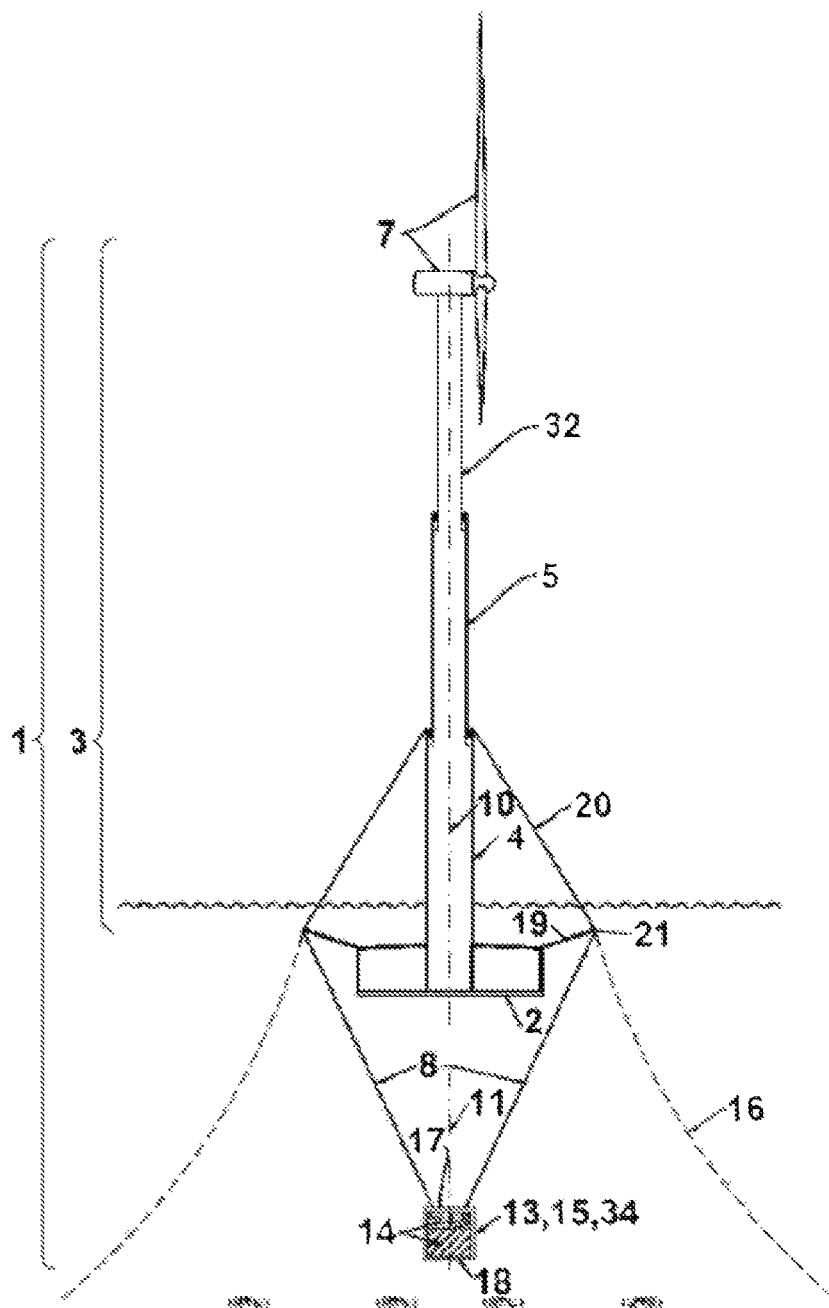
FIG. 4 shows a schematic plan view with a partial cross-section of a floating substructure with a single suspended massive body and chains as means for maintaining the position, with extensor arms and stays, with a wind turbine.

FIG. 4 shows a wind turbine 7 supported by an extended telescopic shaft 3 formed by three tubular segments, that is, a base segment 4 and two superposition segments 5, 32. In turn, the telescopic shaft 3 rests by its base segment 4 on a flotation base 2. In this embodiment the shaft is semi-emerged and the flotation base 2 is submerged, together forming part of a floating substructure 1 for a wind turbine. From the peripheral area of said flotation base 2 emerge three retaining cables 8 (of which only two are visible due to the view shown). Specifically, in this embodiment the flotation base 2 comprises three extensor arms 19 that extend laterally out of said flotation base 2 and from each of said extensor arms 19 leaves a corresponding cable. These retaining cables 8 are joined on the end opposite the end attached to the flotation base 2, to a container in the form of a hollow box 13 made from concrete. The interior of the common box 13 is completely filled with a specific mix of ballast materials, such that the flotation base 2 is at its operational depth. Said cables are deployed at an angle to the vertical, such that the upper end of each cable is farther from the central vertical axis 10 of the shaft than the lower end of the same cable. In this embodiment, the flotation base 2 is not ballasted.

In this embodiment, the floating substructure 1 further comprises means 16 for maintaining the position by which the floating substructure 1 is attached to the seabed. Said means 16 for maintaining the position comprise three moorings (of which only two are visible due to the view shown), each of which starts at a corresponding extensor arm 19 and hangs downward away from the flotation base 2 until resting on the seabed. In this embodiment, each of these moorings is formed by a chain, and said assembly of chains, due to their weight, prevents or at least limits the lateral movement of the floating substructure 1.

In addition, the floating substructure 1 includes three stays 20 each of which starts at a corresponding extensor arm 19 and is joined by its other end to the upper end of the base segment 4 of the shaft of the floating substructure 1. In fact, in this embodiment three strands are provided, each of which is attached on one end to the common box 13 and on the other end to the upper end of the base segment 4 of the shaft of the floating substructure 1. Each of said strands passes through a deflection element 21 placed at the free end of a respective extensor arm 19, such that each strand is divided into a bottom segment reaching from an extensor arm 19 to the common box 13 and an upper segment that extends from an extensor arm 19 to the upper end of the base segment 4 of the shaft of the floating substructure 1. Then each of said lower segments forms each of said retaining cables 8, and each of said upper segments forms each one of said stays 20. Said deviation element 21 in this embodiment is a plastic element with a curved face that allows the cable to deflect, adopting a suitable bending radius.

Figure 5:
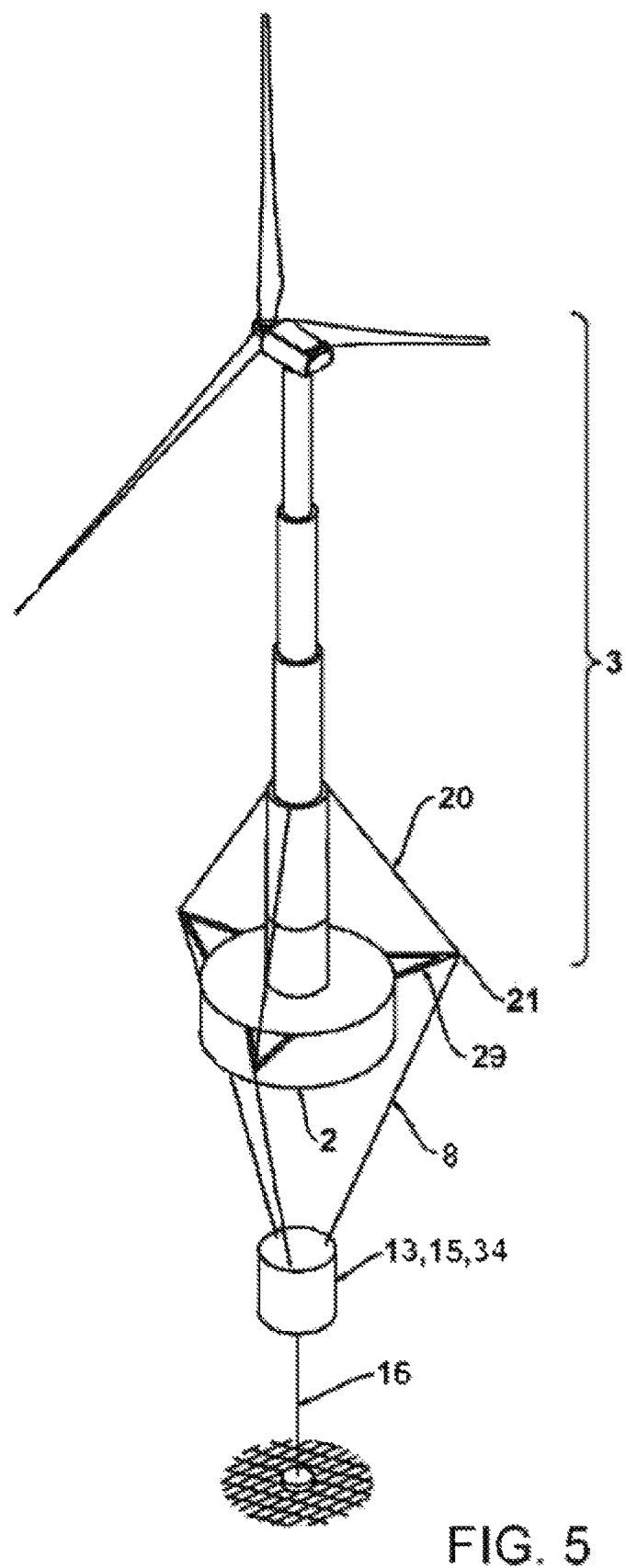
FIG. 5 shows a schematic plan view with a partial cross-section of a floating substructure with a single suspended massive body and a cable-pile assembly as means for maintaining the position, with extensor arms and stays, with a wind turbine.

FIG. 5 shows a wind turbine 7 supported by an extended telescopic shaft 3 formed by four tubular segments, that is, a base segment 4 and three superposition segments. In turn, the telescopic shaft 3 rests by its base segment 4 on a flotation base 2. From the peripheral area of said flotation base 2 emerge three retaining cables 8. Specifically, in this embodiment the flotation base 2 comprises three extensor arms 19 that extend laterally out of said flotation base 2 forming a spatial layout, and from each of said extensor arms 19 leaves a corresponding cable. These retaining cables 8 are joined on the end opposite the end attached to the flotation base 2, to a container in the form of a hollow box 13 made from concrete. The interior of the common box 13 is completely filled with ballast material 14, such that the flotation base 2 is at its operational depth. Said cables are deployed at an angle to the vertical, such that the upper end of each cable is farther from the central vertical axis 10 of the shaft than the lower end of the same cable.

In this embodiment, the floating substructure 1 further comprises means 16 for maintaining the position by which the floating substructure 1 is attached to the seabed. Said means 16 for maintaining the lateral position comprise a pile anchored to the seabed and a single mooring attached on one end to the common box 13 and on the other end to said pile. As indicated above, the interior of the common box 13 is completely filled with a ballast material 14, such that the flotation base 2 is placed at its operational depth, and such that the means 16 for maintaining the position are not intended or designed to provide a downward force means in order to determine the depth of the floating substructure 1; instead, they only withstand the tensions caused by forces exerted on the floating substructure 1 by external actors, such as waves, sea currents, etc.

In addition, the floating substructure 1 includes three stays 20 each of which starts at a corresponding extensor arm 19 and is joined by its other end to the upper end of the base segment 4 of the shaft of the floating substructure 1. Preferably, the stays 20 are pre-installed, that is, one end of each stay 20 is attached either to the floating base or to the upper end of the base segment 4 of the shaft of the floating substructure 1 before the transportation step, while the rest of the stay 20 is folded and attached to the floating substructure. After the transportation step, each stay 20 is extended and attached on its opposite side either to the upper end of the base segment 4 of the shaft of the floating substructure 1 or to the floating base, respectively.

Reference is now made to FIGS. 6 and 7, which show schematically three corresponding embodiments of an installation method according to the invention.

With reference specifically to FIG. 6, view 6(a) shows a transportation unit 9 in a transportation step where said floating and free-standing transport unit 9, formed by a flotation base 2 with reels 30 for the retaining cables, a telescopic shaft 3 in a retracted arrangement supported by said flotation base 2, and a wind turbine 7 joined to the head segment 32 of said telescopic shaft 3, is towed by a tug boat 28. From the peripheral area of said flotation base 2 emerge three retaining cables 8 (of which only two are visible due to the view shown). These retaining cables 8 are attached by their end opposite to the end joined to the flotation base 2, to a container intended to be suspended at a certain distance from the seabed, thereby acting as downward force means, in the form of a box body 13, comprising at least a cavity, the profile of which is the same as that of a central bottom recess in the flotation base 2. In this transportation step said common box 13 is therefore abutting the flotation base 2, housed in said recess, and is transported together with said base. Said common box 13 remains abutting the flotation base 2 in this transportation step because as the common box 13 is hollow and empty, it floats on the body of water, and is therefore carried by the flotation base 2.

In fact, once the transportation step shown in view 6(a) has finished and before the equilibrium condition shown in view 6(b) is reached, the common box 13 is partially ballasted with a first ballast material 14 until said cables are fully extended.

View 6(b) then shows the transport unit 9 in said equilibrium condition, with the cables fully extended, and the common box 13 suspended at a certain distance from the seabed, corresponding to its buoyancy-point, with the flotation base 2 floating on the water.

Then, prior to the installed condition shown in view 6(c), means 16 for maintaining the position are attached to the floating substructure 1 by which the floating substructure 1 is anchored to the seabed. Said means 16 for maintaining the position comprise two moorings, each of which starts at the peripheral area of said common box 13 and hangs down away form said common box 13 until resting on the seabed. In this embodiment, each of these moorings is formed by a chain attached to an anchor on the seabed, and said assembly of chains prevents or at least limits the lateral movement of the floating substructure 1. Alternatively, said means 16 for maintaining the position can be connected to the floating substructure 1 before ballasting the suspended container, or can be connected to a different part of the floating substructure 1 such as the flotation base 2.

The common box 13 is then fully ballasted using a second ballast material 14, such that the flotation base 2 is lowered to its operational depth, compressing the air trapped in the central lower recess of the flotation base 2.

View 6(c) shows the floating substructure 1 according to the present invention in said installed condition, where the cables are fully extended and under tension, the common box 13 is fully ballasted so that the flotation base 2 is at its operational depth, and the lower central recess in the flotation base 2 contains a compressed air chamber 22 that can increase the buoyancy experienced by the flotation base 2. Regulating the air contained in said chamber 22 can allow regulating the buoyancy force and therefore the depth of the floating substructure assembly 1. This embodiment also incorporates a Wells type turbine 23 in an air passage between said compressed air chamber 22 and the interior enclosure of the shaft, such that the variations in the water depth of said chamber 22 caused by waves can be used to generate power.

In this case the shaft of the floating substructure 1 is emerged and the flotation base 2 is semi-submerged.

With reference specifically to FIG. 7, view 7(a) shows the dry dock system of the flotation base 2. View 7(b) shows a transportation unit 9 in the transportation step, where said transportation unit 9 is floating and free-standing and is formed by a flotation base 2, a telescopic shaft 3 in a retracted condition supported by said flotation base 2, and a wind turbine 7 joined to the head segment 32 of said telescopic shaft 3; the same view 7(b) shows the independent transportation, simultaneous or otherwise, of a container in the form of a concrete box 13, floating and free standing, that is also towed to the site. Said box 13 has the retaining cables 8 prefitted by reels 30 for the retaining cables. Said box 13 is partially ballasted from the start of the transportation without this compromising its stable buoyancy, such that the amount of ballast that must be supplied in the final offshore site is reduced.

Optionally, the transportation unit 9 and the container in the form of a concrete box 13 can be transported joined and/or with the connections of the two ends of at least part of the retaining cables 8 already established.

View 7(*c*) shows a later step of the installation process in which the retaining cables 8 transported on the container have been extended to different lengths, in full or in part, and connected to peripheral points of the flotation base 2.

View 7(*d*) shows the ballast process of the concrete box 13, which leads to its gradual fall until it is finally suspended from the retaining cables 8. The weight of the box 13 and the retaining cables 8 that hold it will make the box 13 tend on its own towards its final position with respect to the flotation base 2, which in this case coincides with the central vertical axis 10 of the shaft and of the flotation base 2. However, the process can also be aided by one or more tug boats 28.

Once the box 13 is suspended from the flotation base 2 by inclined retaining cables 8, the structure will have a great stability and the telescopic shaft 3 will be raised together with the wind turbine 7, as shown in view 7(*e*). Finally, view 7(*f*) shows the installed condition of the floating substructure 1 with the box 13 fully ballasted and the incorporation of means for maintaining the lateral position. In this case the flotation base 2 is ballasted partially to adjust the depth of the structure. The ballast material 14 is preferably liquid and its volume adjustable, allowing to adjust as required the depth of the assembly according to circumstances, particularly wind and waves.

In the embodiment according to the invention of FIGS. 6 and 7, the container, abutting or transported independently, provides the required stability through the retaining cables 8 during the ballasting process of the flotation base 2, even if the flotation base 2 is fully submerged.

Figure 9:
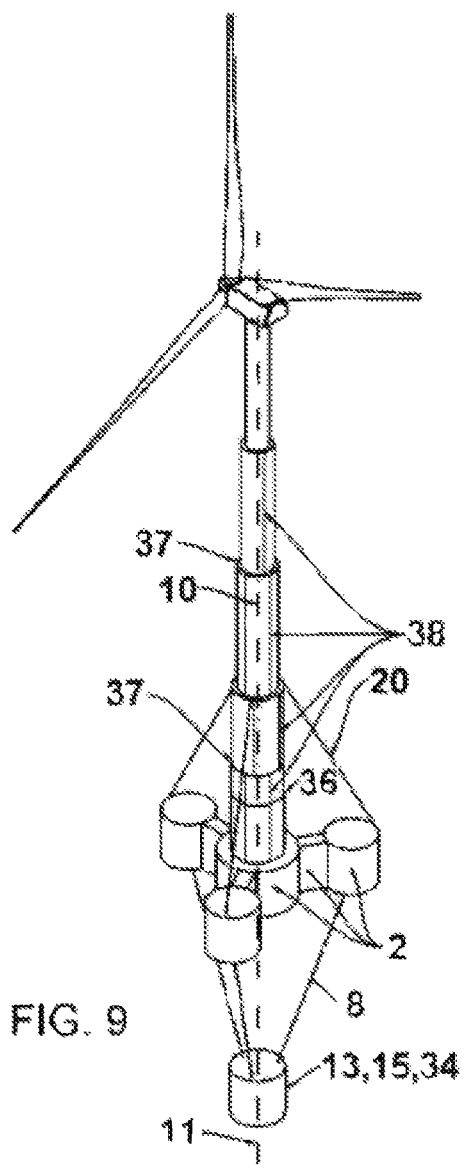
FIG. 9 shows a schematic perspective view of a floating substructure with a single suspended massive body, with another flotation base with several bodies and stays, with a wind turbine.

FIGS. 8 and 9 show corresponding embodiments of a floating substructure 1 for a wind turbine according to the present invention, in which the flotation base 2 is formed by a plurality of hollow bodies. Specifically, FIG. 8 shows an embodiment of a floating substructure 1 for a wind turbine according to the present invention in which the flotation base 2 is formed by a main hollow body and two additional hollow bodies, all hollow bodies joined to each other by lattice type structures; FIG. 9 shows an embodiment of the floating structure 1 for a wind turbine according to the present invention in which the flotation base 2 is formed by a main hollow body and three additional hollow bodies, each one of the additional hollow bodies being joined to the main hollow body by a bar type structure which in this case is also formed by a prismatic hollow body.

In the embodiment of FIG. 8, the main hollow body is disc shaped and supports on it a non-telescopic tubular shaft 40 which in turn supports the wind turbine 7, and the additional hollow bodies are arranged such that they form a triangular layout with the main hollow body. In this embodiment each one of the retaining cables 8 starts at a different hollow body and they meet at a container acting as the downward force means. In addition, the retaining cables 8 all have the same length, such that said container is displaced with respect to the central vertical axis 10 of the shaft and substantially coincides with the central vertical axis 11 of the flotation base 2 with three bodies that is displaced with respect to the central vertical axis 10 of the shaft.

In turn, in the embodiment of FIG. 9 the main hollow body is disc shaped and supports the shaft of the floating substructure 1, and the additional hollow bodies are arranged around said main hollow body at positions equidistant to each other and to said main body. In this embodiment the retaining cables 8 start at each of the different hollow bodies and meet at a container acting as the downward force means. In addition, the retaining cables 8 all have the same length, such that said container is displaced substantially on the central vertical axis 10 of the shaft and substantially coincides with the central vertical axis 11 of the flotation base 2.

The floating substructure 1 of this embodiment also comprises three stays 20, each of which arise from each one of the additional hollow bodies and are joined to the upper end of the base segment 4 of the shaft of the floating substructure 1. Preferably the lower end of a stay 20 of a floating system according to the present invention will be joined to the flotation base 2 of the floating structure at a position close to or aligned with the point of union of the upper end of one of the retaining cables 8 to the flotation base 2.

In this embodiment the segments of the telescopic shaft 33 are formed by prefabricated half-segments which, joined at vertical joints 38, form cylindrical segments of the shaft. Similarly, formed between said cylindrical segments are horizontal joints 37 along the shaft.

The tower segments formed by half-segments can be preassembled in dry dock and/or in port to form full segments, and then the full segments attached to the flotation base 2, as an intermediate step also applicable to other offshore substructures that use telescopic towers such as that described in the present invention.

Figure 10:
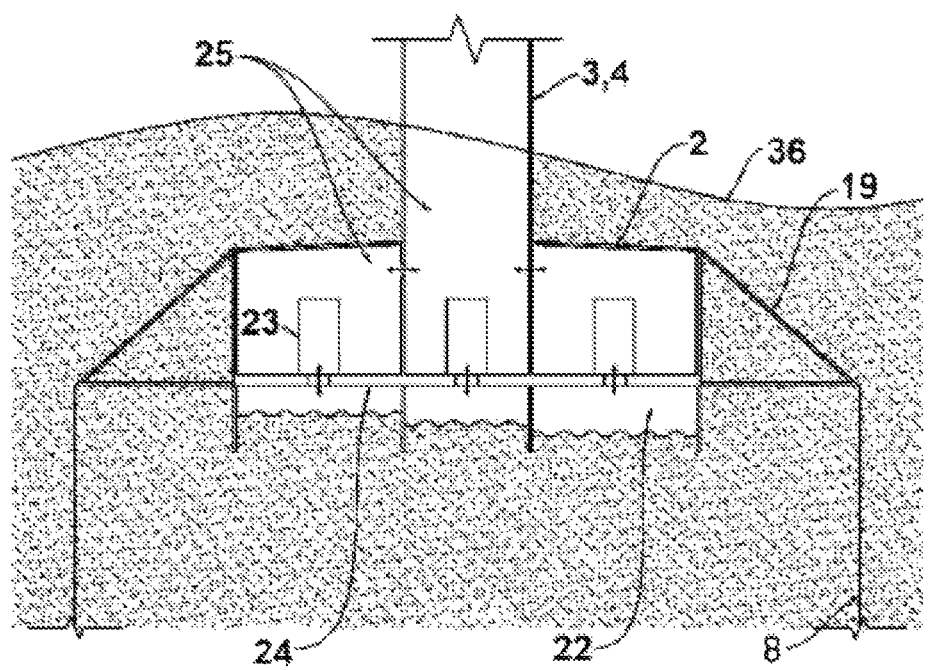
FIG. 10 shows a schematic view of a portion of a floating substructure, specifically a flotation base that includes a pressurised gas chamber and Wells type turbines, as well as extensor arms.

Lastly, FIG. 10 shows a detailed view of an embodiment of a floating substructure 1 according to the present invention, specifically a flotation base 2 with extensor arms 19 that includes a pressurised gas chamber 22 and Wells type turbine 23 to harness wave power.

More specifically, the peripheral wall of the flotation base 2 is extended downward such that a cavity facing downward is defined. This cavity initially contains air which is trapped when the flotation base 2 is placed in the body of water of the site. In addition when the flotation base 2 is submerged said trapped air is compressed, forming said pressurised gas chamber 22. Alternatively or additionally, air or any other pressurised gas can be introduced in said pressurised gas chamber 22. In addition, the flotation base 2 is compartmentalised. Each compartment has an opening in the end wall and, in corresponding with each such opening, a Wells type turbine 23. In addition, the compartments also have an opening in each partition wall between compartments. The partitions between compartments also extend downward such that said pressurised gas chamber 22 is also compartmentalised.

The power generation system of a Wells type turbine 23 is based on OWC (oscillating water column) technology, which relies on the pressure changes generated by waves on the air chamber 22 that drive air through the Wells type turbines 23.

The presence of Wells type turbines 23 in the embodiments of the present invention to generate power from waves in which the floating system is a floating substructure 1 for a wind turbine is particularly appropriate as all the infrastructure provided for evacuating the power generated by the wind turbine is already present.

In addition, the pressurised gas chamber 22 can regulate the volume and/or pressure of the gas contained in said pressurised gas chamber 22, in order to regulate or help regulate the depth of the floating substructure 1 and to adjust or help adjust the resonant frequency of the gas chamber 22 to improve the efficiency of the oscillating water column system.

With reference again to FIGS. 1 and 2, an embodiment of a method for installing a floating substructure 1 for a wind turbine according to the present invention thus comprises the following steps:

fabricating a flotation base 2 in the form of a hollow disc;

placing the flotation base 2 on the body of water at the site;

fabricating on dry dock three segments of a telescopic shaft 3, including a base segment 4 and a head segment 32;

forming a transportation unit 9, buoyant and free standing, which comprises the flotation base 2, the telescopic shaft 3 in a retracted condition centrally supported on said flotation base 2 and a wind turbine 7 supported on the head segment 32 of said telescopic shaft 3;

towing in a floating manner said transportation unit 9 to a first working site different from the final site, the flotation base 2 remaining semi-submerged and the telescopic shaft 3 being in a retracted condition and completely emerged;

securing the upper end of the retaining cables 8 to the flotation base 2;

securing the lower end of the retaining cables 8 to a hollow box 13;

towing in a floating manner the assembly formed by said transportation unit 9, said retaining cables 8 and said common box 13 from said working area to the site, the flotation base 2 remaining semi-submerged and the telescopic shaft 3 being in a retracted condition and completely emerged;

applying, using the retaining cables 8, a downward force on the flotation base 2 generated by said common box 13 as it is ballasted, such that the flotation base 2 is lowered to its operational level;

extending the telescopic shaft 3 together with the wind turbine 7;

attaching to the substructure means 16 for maintaining the position in the form of chains, specifically:

joining a first chain by one of its ends to a first peripheral point of said flotation base 2 such that said chain is extended, moving away from the flotation base 2 until it rests on the seabed, and joining a second chain by one of its ends to a second peripheral point of said flotation base 2 such that said chain is extended, moving away from the flotation base 2 until it rests on the seabed, said first and second peripheral points being placed diametrically opposite each other with respect to the flotation base 2; and regulating the ballast of said common box 13 such that the flotation base 2 maintains its operational depth after attaching said chains to said flotation base 2.

As shown in FIGS. 1 and 2, the means 16 for maintaining the position comprise two chains starting at the flotation base 2 at diametrically opposite points. However, a person skilled in the art will understand that the number of chains and their corresponding starting points in the flotation base 2 may vary to meet specific requirements.

Said first working area is a sheltered area with a great depth.

Figure 12:
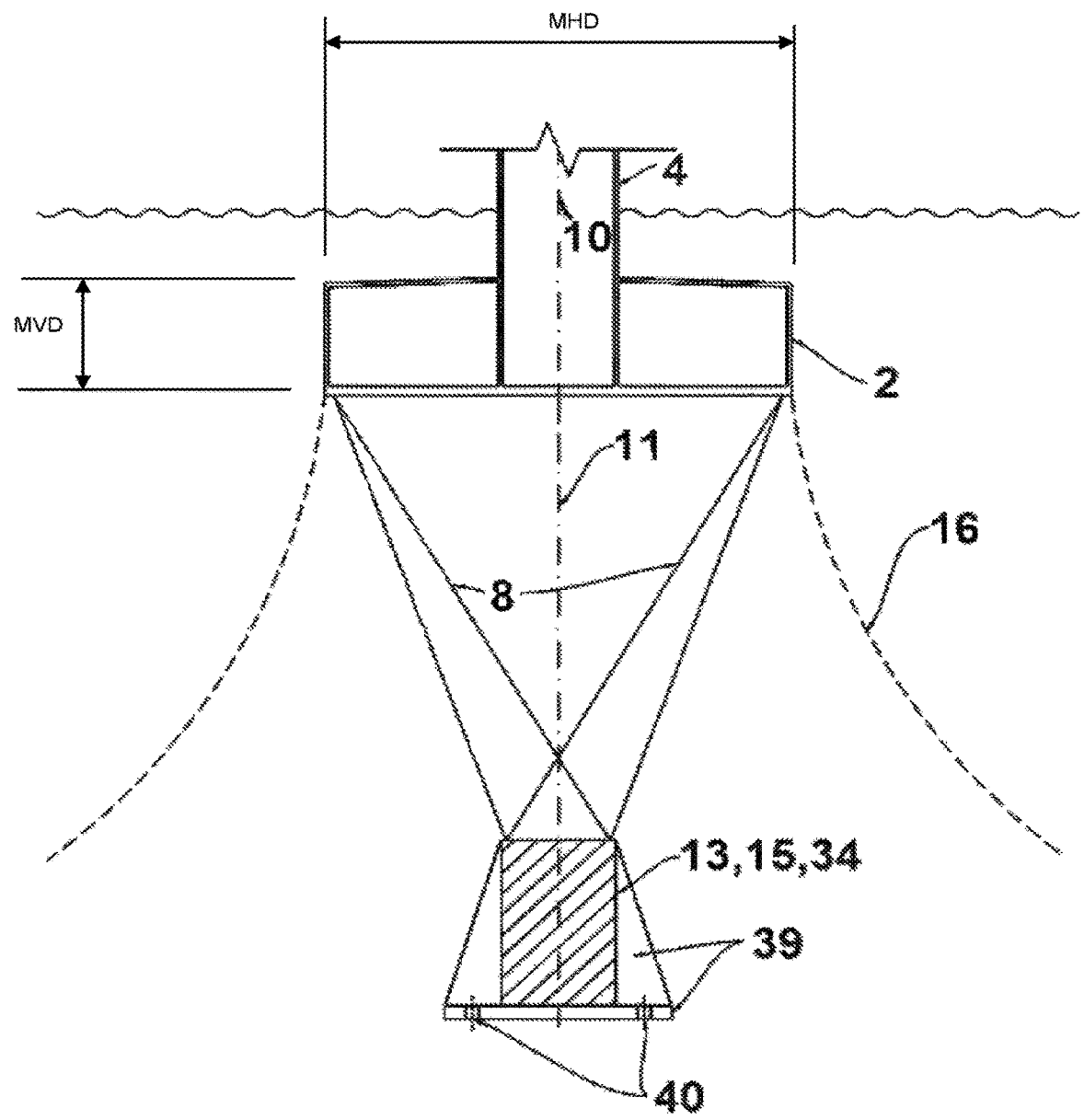
FIG. 12 shows a schematic view of a container that incorporates hydrodynamic damping.

FIG. 12 shows a container incorporating hydrodynamic damping 39 intended to reduce the movement of the floating system. Specifically, the figure shows hydrodynamic damping by what is often referred to as a heave plate, placed on the base of the container that protrudes laterally. Said heave plate will reduce vertical movements. In this specific case, although it is not essential, said heave plate also has a number of orifices 40. Said orifices 40 can control the water flow such that flow is allowed in one direction but prevented in another (for example, in this embodiment to oppose upward movement more than downward movement).

This embodiment also incorporates hydrodynamic damping 39 by attaching vertical elements to the side of the container. Said elements interact with the water surrounding the container and reduce its horizontal movement, increasing its contribution to the stability of the floating system. Said substantially vertical elements can have the form of a plate or solid wall, preferably made from concrete or metal, or in the form of a laminar element as a sail made from fibre materials, textiles or other materials known in the art.

Other types of hydrodynamic damping can also be used without departing from the scope of the invention, even those based on growth of algae or other organisms in the suspended container.

This embodiment also shows that the retaining cables are designed such that two ends of different retaining cables start at approximately the same point, allowing a perfect triangulation of the cables and therefore a more rigid behaviour of the connection between the flotation base and said container. Said triangulations can be generated in a horizontal and in a vertical sense (as shown in the figure), in order to rigidify the union between the two elements against torsion (that is, rotations about the vertical axis of the floating system).

Naturally, the principal of the present invention remaining the same, the embodiments and constructive details may vary considerably from those described and represented for illustration purposes and in a non-limiting sense, without departing from the scope of the present invention as defined in the accompanying claims.

For example, by way of illustration, in light of the teachings of this document it would be obvious for a person skilled in the art that the wind turbine could comprise up-wind or down-wind turbines, as well as any number of blades, not being limited to three blades as shown for illustration purposes.

Also for purposes of illustration, although the present document refers to "cables" used to connect the downward force means and the flotation base, a person skilled in the art will understand that instead of cables these can be chains, rods, slings or the like, without departing from the scope of the invention.

Also for purposes of illustration, a person skilled in the art in view of the teachings of the present document will find it obvious that the lateral extensions referred to herein as "arms" can be coupled or even integrated in a lateral extension in the form of a continuous crown or as crown arcs, or in any other type of structure, without departing from the scope of the invention. Similarly, it will be obvious for a person skilled in the art in view of the teachings of the present document that although circular shapes are preferred for many of the elements comprised in the invention such as the shafts, hollow bodies or boxes, many other shapes are possible without departing from the scope of the invention, such as square or rectangular shapes, or regular and irregular polygons.

Known techniques may be used to regulate the volume and/or weight of the ballast material of the containers, such as those used in submarines to control depth.

What is claimed is:

1. A method for installing a floating system, said floating system comprising:
a wind turbine,
a flotation base including at least a hollow body said flotation base having a maximum horizontal dimension and a maximum vertical dimension, wherein the maximum horizontal dimension of the flotation base is greater than the maximum vertical dimension of the flotation base,
at least one shaft supported by said flotation base to support on a head of the at least one shaft the wind turbine, wherein the floatation base, the at least one shaft, and the wind turbine form a transport unit, which floats and is free standing,
at least three retaining cables, said at least three retaining cables comprising
corresponding upper ends and corresponding lower ends, wherein the corresponding upper ends are attached to said flotation base such that said at least three retaining cables are tensioned and exert on said flotation base a downward force that increases the stability of the floating system;—at least one container suspended from said at least three retaining cables and completely submerged, located below the flotation base and raised above a seabed, wherein the corresponding lower ends of said at least three retaining cables are attached to said at least one container,
wherein said at least one container comprises at least one cavity, and
wherein:
in an operative condition of the floating system, either said at least one shaft is semi-emerged and said flotation base is submerged, or said at least one shaft is emerged and said flotation base is semi-submerged;
the floatation base is selectively fillable with ballast material and is configured for stable buoyancy of the transport unit; and
the at least one container is buoyant when the at least one cavity is in an unballasted condition
the method comprising the following steps:
a) manufacturing the flotation base on-shore or in-shore,
b) attaching the corresponding upper ends of said at least three retaining cables to the flotation base,
c) attaching the corresponding lower ends of said at least three retaining cables to said at least one container,
d) dry-manufacturing the at least one shaft,
e) placing the flotation base on a body of water,
f) forming on-shore or in-shore the transport unit, floating and free standing, that comprises the flotation base, the at least one shaft, and the wind turbine, by placing the at least one shaft on the flotation base and placing the wind turbine to the at least one shaft,
g) manufacturing on-shore or in-shore the at least one container and placing the at least one container in said body of water,
h) transporting in a floating manner, using tug boats, said floating and free standing transport unit to an installation site, the flotation base remaining semi-submerged and the at least one shaft fully emerged during transport,
i) transporting said at least one container, the cavity of which is empty, using tug boats,
j) filling said at least one container with ballast material for gradual decent until said at least one container is eventually suspended from the retaining cables,
k) ballasting said at least one container with ballast material such that weight thereof increases to submerge said at least one container to an operational depth.

2. The method according to claim 1, further comprising, after step h), filling said flotation base with ballast material to adjust depth of the flotation base.

3. The method according to claim 1, wherein said at least one container is abutted to the floatation base to form a part of the transport unit and is transported together with said flotation base and said at least one shaft, and once at said installation site, is filled with ballast material and let down from said flotation base until the at least one container reaches the weight and position required for an installed condition of said floating system.

4. The method according to claim 1, wherein in an installed condition of the floating system, the flotation base is completely submerged and the at least one shaft is partially submerged.

5. The method according to claim 1, wherein step h) comprises:
transporting to a first site which is different from the installation cite prior to step for the applying by the at least three retaining cables a downward force on the flotation base, and
transporting to the installation cite after the step for the applying by the at least three retaining cables a downward force on the flotation base.

6. A floating system comprising:
a wind turbine
a flotation base including at least one hollow body, wherein the maximum horizontal dimension of the flotation base is greater than the maximum vertical dimension of the flotation base;
at least one shaft supported by said flotation base to support on a head of the at least one shaft the wind turbine;
at least one container; and
at least three retaining cables, said at least three retaining cables comprising corresponding upper ends being attached to said flotation base and corresponding lower ends being attached to said at least one container;
wherein:
the floating base, the at least one shaft, and the wind turbine form a transport unit, which floats and is free standing:
said at least one container comprises at least one cavity and is, suspended from said at least three retaining cables and completely submerged, located below the flotation base and raised above the seabed;
said at least three retaining cables are tensioned and exert on said flotation base a downward force that increases the stability of the floating system;
and wherein:
in an operative condition of the floating system, either said at least one shaft is semi-emerged and said flotation base is submerged, or said at least one shaft is emerged and said flotation base is semi-submerged;
the floatation base is selectively fillable with ballast material and is configured for stable buoyancy of the transport unit; and
the at least one container is buoyant when the at least one cavity is in an unballasted condition.

7. The floating system according to claim 6, wherein said at least three retaining cables are arranged such that they are inclined with respect to the vertical.

8. The floating system according to claim 6, wherein:
said at least one shaft is telescopic and comprises at least two segments, each of the at least two segments including a base segment and a head segment.

9. The floating system according to claim 6 further comprising at least one stay, an upper end of which is joined to the at least one shaft and a lower end of which is joined to the flotation base, wherein said at least one stay is inclined with respect to the vertical such that the lower end of the stay is farther from the central vertical axis of the at least one shaft than the upper end of the stay.

10. The floating system according to claim 6, wherein weight of the at least one container, when the at least one cavity is in ballasted condition, is enough for the center of gravity of the floating system to descend to a level lower than the center of buoyancy of said floating system.

11. The floating system according to claim 6, wherein the at least one container can be provisionally abutted to the flotation base.

12. The Floating system according claim 6, wherein the flotation base comprises at least one extensor arm projected laterally outward from the perimeter of the body or of a group of bodies of the flotation base and at least one of said at least three retaining cables is attached by the upper end of the at least one of said at least three retaining cables to a corresponding extensor arm.

* * * * *